United States Patent
Reches (10) Patent No.: US 10,067,868 B2
(45) Date of Patent: Sep. 4, 2018

(54) MEMORY ARCHITECTURE DETERMINING THE NUMBER OF REPLICAS STORED IN MEMORY BANKS OR DEVICES ACCORDING TO A PACKET SIZE

(71) Applicant: HUAWEI TECHNOLOGIES CO., LTD., Shenzhen, Guangdong (CN)

(72) Inventor: Shlomo Reches, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 14/490,867

(22) Filed: Sep. 19, 2014

(65) Prior Publication Data

US 2015/0006828 A1  Jan. 1, 2015

Related U.S. Application Data

(63) Continuation of application No. PCT/EP2012/054757, filed on Mar. 19, 2012.

(51) Int. Cl.
| | |
|---|---|
| G06F 12/06 | (2006.01) |
| G06F 3/06 | (2006.01) |
| H04L 12/805 | (2013.01) |
| G06F 12/02 | (2006.01) |

(52) U.S. Cl.
CPC .......... *G06F 12/0623* (2013.01); *G06F 3/065* (2013.01); *G06F 3/0644* (2013.01); *G06F 12/023* (2013.01); *H04L 47/36* (2013.01); *G06F 2212/1016* (2013.01); *G06F 2212/2532* (2013.01)

(58) Field of Classification Search
None
See application file for complete search history.

(56) References Cited

U.S. PATENT DOCUMENTS

| | | | | |
|---|---|---|---|---|
| 5,758,050 | A * | 5/1998 | Brady | G06F 3/0607 711/173 |
| 2003/0156473 | A1* | 8/2003 | Sinclair | G06F 9/4403 365/200 |
| 2005/0002371 | A1 | 1/2005 | Andersen | |
| 2005/0240745 | A1 | 10/2005 | Iyer et al. | |
| 2007/0198782 | A1* | 8/2007 | Sved | G06F 13/1647 711/154 |
| 2012/0023291 | A1* | 1/2012 | Zeng | G06F 12/0653 711/114 |

(Continued)

OTHER PUBLICATIONS

International Search Report dated Jan. 22, 2013, in corresponding International Patent Application No. PCT/EP2012/054757.

(Continued)

*Primary Examiner* — Sean D Rossiter
*Assistant Examiner* — Charles J Choi
(74) *Attorney, Agent, or Firm* — Staas & Halsey LLP (57) ABSTRACT

A memory architecture for storing information units, the memory architecture comprising a plurality of memory banks or a plurality of memory devices and a memory controller for initiating storage of an information unit and a number of replicas of the information unit in the memory banks or in the memory devices, the memory controller discriminating the replicas in dependence on a size of the information unit.

14 Claims, 6 Drawing Sheets

(56) References Cited

U.S. PATENT DOCUMENTS

2012/0173841 A1* 7/2012 Meier ................ G06F 12/1009
711/202
2015/0019829 A1* 1/2015 Sivasubramanian ........................
G06F 17/30595
711/162

OTHER PUBLICATIONS

PCT International Search Report dated Jan. 23, 2013 in corresponding International Patent Application No. PCT/EP2012/054757.
Chinese Office Action dated Jul. 28, 2016 in corresponding Chinese Patent Application No. 201280070727.6.
Chinese Search Report dated Jun. 15, 2016 in corresponding Chinese Patent Application No. 2012800707276.

* cited by examiner

MEMORY ARCHITECTURE DETERMINING THE NUMBER OF REPLICAS STORED IN MEMORY BANKS OR DEVICES ACCORDING TO A PACKET SIZE

CROSS-REFERENCE TO RELATED APPLICATION

This application is a continuation of International Application No. PCT/EP2012/054757, filed on Mar. 19, 2012, which is hereby incorporated by reference in its entirety.

BACKGROUND

The present application relates to a memory architecture comprising a plurality of memory banks or a plurality of memory devices for storing information units and a memory controller, in particular to a memory architecture according to DRAM technology.

High speed memories are a critical resource in system performance like network systems, graphic controllers, CPU architectures, etc. Architectures like caching are a common approach when the access pattern is not completely random. However, in applications like switches, routers and other types of network devices this is not the case. The memory access pattern is derived from the packet arrival which is completely random.

The DRAM (dynamic random access memory) technology has poor performance for applications with random access nature. The barrier lies in the memory intrinsic delay when switching from one row to another in the same bank. This delay is known as tRC (row cycle time) and its magnitude remained almost unchanged since the very first DRAM devices until today. The limitations of DRAM memories in networking applications are mainly the random access rate and not the bandwidth. There are limiting factors like tRRD (row active to row active delay) and tFAW (four band activation window time) that reduce memory performance significantly under random access scenarios. However, despite this performance bottleneck there are other advantages that make DRAM technology irreplaceable. The advantages are very high density, low cost and low power. In applications that demand both, high density and high performance, alternatives like SRAM (static random access memory) technology are impractical to use due to cost, power and area issues. So it is desired to improve the performance of the DRAM technology in order to open new opportunities in fields such as network communication and similar applications that require high rates of short random accesses for storing different types of information units, such as packet descriptors or control packets, statistical counters, but also data packets in network communication.

SUMMARY

It is the aspect of the application to improve the performance of a DRAM memory architecture.

This aspect is achieved by the features of the independent claims. Further implementation forms are apparent from the dependent claims, the description and the figures.

The application is based on the finding that improving the performance of a memory architecture can be achieved by a traffic aware data replication concept, i.e. by storing replicas of the information units in the memory architecture depending on their size.

Thus, long information units such as data packets in network communications are only stored once without replication while short information units such as control information, e.g. packet descriptors are stored in a replicated manner wherein the size of the information units determines the number of replicas to be stored in the memory architecture. This mechanism provides a discriminating performance. If the application requires a higher rate, the number of data replications is increased. If the application requires only a lower rate the number of data replications is decreased. By determining the number of replications by the size of the information units, the number of replications can be minimized and therefore, the application saves both, memory space and power. Thus, the performance of the memory architecture is improved.

In order to describe the application in detail, the following terms, abbreviations and notations will be used:
information
unit: denotes a formatted unit of data delimited by a frame. An information unit describes different types of data packets such as user (payload) data packets, control packets, packet descriptors or statistical counters.
PKT: packet or information unit,
DRAM: Dynamic random access memory,
SRAM: Static random access memory,
PPS: packet rate per second,
tRC: row cycle time,
tRRD: row active to row active delay,
tFAW: four band activation window time,
B byte, bytes,
CPU: central processing unit.

According to a first aspect, the application relates to a memory architecture for storing information units, the memory architecture comprising: a plurality of memory banks or a plurality of memory devices; and a memory controller for initiating storage of an information unit and a number of replicas of the information unit in the memory banks or in the memory devices, the memory controller discriminating the replicas in dependence on a size of the information unit.

The term "memory architecture" denotes either a memory device having a plurality of memory banks or a plurality of memory devices each having a single memory bank. Therefore, when the term "memory bank" is used in the following, it shall denote both, a memory bank of a memory device having a plurality of memory banks and a memory device of a plurality of memory devices, each memory device having a single memory bank. A memory device having a plurality of memory banks is thus equivalent to a plurality of memory devices each having a single memory bank.

When the storage of information units is performed discriminating the replicas depending on their size, a replication mechanism is provided that replicates information units according to the traffic needs. For minimum length packets having high packet rates per second, maximum access rates to the memory banks can be provided while for larger packets the number of replications can be reduced. Thus, the memory architecture can be optimal fitted to the data traffic requirements.

In a first possible implementation form of the memory architecture according to the first aspect, the information unit is one of a packet descriptor, a data packet, a control information packet, and a statistical counter.

While data packets transporting user data or other kinds of data have a relatively long size, control information or packet descriptors and also counters used for statistical or other purposes have a relatively short and fixed size. The memory architecture provides improved performance for both scenarios, short packets as well as long packets because the replication is size-sensitive.

In a second possible implementation form of the memory architecture according to the first aspect as such or according to the first implementation form of the first aspect, the memory controller is configured to determine the number of replicas in dependence on a rate of the information units.

By determining the number of replicas based on a rate of the information units, the memory access mechanism is matched to the rate of the incoming data traffic. When high traffic rates have to be managed, a large number of replications is stored thereby enabling a high degree of parallel processing improving the processing speed. When low traffic rates have to be managed, a small number of replications is stored reducing the degree of parallel storage and thereby enabling the memory architecture for storing a lot of data.

High traffic rates occur when the memory controller predominantly processes control packets as control packets have minimum packet sizes, e.g. smaller than 76 bytes. Control packets are used for signalling to indicate the state of network elements to other network elements in order to initiate a communication path in the network before data transmission is initiated. Therefore, a large number of control packets is transmitted before a single user data packet is transmitted. Low traffic rates occur when the memory controller predominantly processes user data packets as user data packets have maximum packet sizes, e.g. greater than 652 bytes. Usually a user data packet is transmitted only once when the communication path is initiated and no transmission error occurs.

In a third possible implementation form of the memory architecture according to the second implementation form of the first aspect, the memory controller is configured to initiate storage of only one replica of the information unit if the size of the information unit exceeds a threshold or if the rate of the information unit is below a threshold.

The replication mechanism can be controlled by a threshold thereby enabling an efficient and simple implementation.

In a fourth possible implementation form of the memory architecture according to the first aspect as such or according to any of the preceding implementation forms of the first aspect, the memory controller is configured to determine the number of replicas as being inversely related to the size of the information unit.

When the number of replicas is inversely related to the size of the information unit, for long packets a small number of replicas is generated in the memory while for short packets a large number of replicas is generated. Thus, the memory architecture enables parallel processing for short packets thereby improving memory access speed and the memory architecture enables sequential processing for long packets thereby improving the data size to be stored in the memory architecture.

In a fifth possible implementation form of the memory architecture according to the first aspect as such or according to any of the preceding implementation forms of the first aspect, the plurality of memory banks or memory devices are partitioned into a plurality of replication zones, each of the replication zones associated to a different type, the type indicating a number of replicas of the information unit stored in the replication zone.

By using a type for the replication zone, a relation between a packet and its replica can be provided allowing efficient memory planning.

In a sixth possible implementation form of the memory architecture according to the fifth implementation form of the first aspect, each replication zone comprises memory addresses of each memory bank or memory device.

When each replication zone comprises memory addresses of each memory bank the full memory of the memory architecture is exploited and parallel processing can be managed in a very efficient manner improving the access speed of the memory architecture.

In a seventh possible implementation form of the memory architecture according to the fifth implementation form of the first aspect or according to the sixth implementation form of the first aspect, the memory banks or memory devices are uniformly partitioned into the replication zones.

When the memory banks are uniformly partitioned into the replication zones, the memory controller can be simply designed without computing relations between different memory banks. The replication mechanism may be easily ported to a memory architecture having another number of memory banks.

In an eighth possible implementation form of the memory architecture according to one of the fifth implementation form to the seventh implementation form of the first aspect, in each memory bank or memory device a first part of memory addresses is configured for storing a first number of replicas of the information unit, and a second part of memory addresses is configured for storing a second number of replicas of the information unit, and a size of the first part of memory addresses and a size of the second part of memory addresses are adjustable.

When the size is adjustable, the replication can be matched to the incoming information units. In a memory architecture to be applied for control information the size of the 8-replication zone may be larger than the size of the 1-replication zone as most control packets are stored in the 8-replication zone. Thus, the memory architecture can be flexibly adapted according to the traffic needs.

In a ninth possible implementation form of the memory architecture according to the eighth implementation form of the first aspect, the first part of memory addresses takes a first fraction of the memory addresses of each memory bank or memory device, and the second part of memory addresses takes a second fraction of the memory addresses of each memory bank or memory device, wherein a ratio between the first fraction and the second fraction of the memory addresses is adjustable.

When the ratio is adjustable, the replication can be matched to the incoming information units. The ratio between the 8-replication zone and the 1-replication zone may be larger, as most control packets are stored in the 8-replication zone. Thus, the memory architecture can be flexibly adapted according to the traffic needs.

In a tenth possible implementation form of the memory architecture according to one of the fifth implementation form to the ninth implementation form of the first aspect, the memory banks or memory devices are configured by an address-type relation such that a memory address of a memory bank or memory device indicates the type of replication zone the memory address belongs to.

This allows planning of the memory accesses by the memory controller in advance. Thus, the planning time is saved during online operation of the memory controller and time can be used for serving memory accesses increasing the performance of the memory architecture.

In an eleventh possible implementation form of the memory architecture according to the tenth implementation form of the first aspect, the memory controller is configured to use the address-type relation for planning accesses to the memory banks or memory devices in advance.

The saved planning time can be used for serving memory accesses increasing the performance of the memory architecture.

In a twelfth possible implementation form of the memory architecture according to the first aspect as such or according to any of the preceding implementation forms of the first aspect, the memory controller is configured to allocate a number of memory addresses for storing the information unit and the replicas of the information unit depending on the size of the information unit and/or depending on a rate of the information units.

The memory architecture may operate depending on a traffic rate and/or on a traffic size of the data traffic thereby improving the performance of memory accesses.

The traffic rate or traffic throughput is the rate of data traffic, i.e., information units, accessing the memory device. The traffic rate is usually measured in bits per second (bit/s or bps), and sometimes in data packets per second (PPS). The traffic size is the size of the information units accessing the memory device, i.e. the number of bits or bytes delimited by the information units.

In a thirteenth possible implementation form of the memory architecture according to the first aspect as such or according to any of the preceding implementation forms of the first aspect, the memory controller is configured to initiate the storage of the information unit and the replicas of the information unit in the memory banks or memory devices in a single access or in a group (burst) of accesses.

Initiating the storage of the information unit and the replicas of the information unit in the memory banks in a single access improves the speed of memory accesses. The memory architecture is applicable to RLDRAM III technology or multiple DRAM devices like DDR3 SDRAM, DDR4 SDRAM, etc.

According to a second aspect, the application relates to a method for storing information units in a plurality of memory banks or in a plurality of memory devices, the method comprising: initiating storage of an information unit and a number of replicas of the information unit in the memory banks or in the memory devices, the initiating storage discriminating the replicas in dependence on a size of the information unit.

When the storage of information units is performed discriminating the replicas depending on their size, a replication mechanism is provided that replicates information units according to the traffic needs. For minimum length packets having high packet rates per second, maximum access rates to the memory banks can be provided while for larger packets the number of replications can be reduced. Thus, the memory architecture can be optimal fitted to the data traffic requirements.

A specific case which aspects of the application solve, but to which they are not limited to, is the case of network engines like in switches, routers, etc. In such devices the worst case scenario is derived by burst of minimum packets that introduce burst of random memory access at maximum packet rate per second (PPS). A 40 Gbps port, for example, has a maximum PPS rate of 60 MPPS. For each packet there could be one or more memory accesses like in the common case of read-modify-write. Hence, the actual access rate for control could reach 60M or 120M random accesses per second. This is far beyond the reach of DRAM technology that delivers roughly 10M read and writes accesses per second. Applying a rough calculation for this scenario with tRC≈50 ns results in two accesses at 100 ns or 10M accesses per second.

The performance bottleneck in modern pipeline architecture is the memory. There are numerous memory architectures to increase performance. One branch is data replication and a common example is ping pong buffer. The problem of ping pong buffer and similar approach is that they are blind to the traffic properties. As such maximum replication is commenced to any data. As a side effect there is a waste in memory space and power. The implementation forms of the first and the second aspect described herein are traffic sensitive and the amount of replication is controlled by the traffic needs. The result is increasing performance while exploiting the memory capacity and saving power.

Implementation forms of the first and the second aspect described herein put focus on dynamic traffic according to packet size. The intrinsic property of packet at certain size is the maximum PPS. Hence, the PPS is limited for both ingoing and outgoing packets. However the same mechanism of traffic aware replication is implemented in other implementation forms where the traffic rate is monitored or known in advance like in the case of bandwidth contract.

Implementation forms of the first and the second aspect exploit the latest RLDRAM III technology where multiple write accesses allow data replication to several memory banks in a single access.

BRIEF DESCRIPTION OF THE DRAWINGS

Further embodiments of the application will be described with respect to the following figures, in which.

DETAILED DESCRIPTION OF EMBODIMENTS OF THE APPLICATION

Figure 1A:
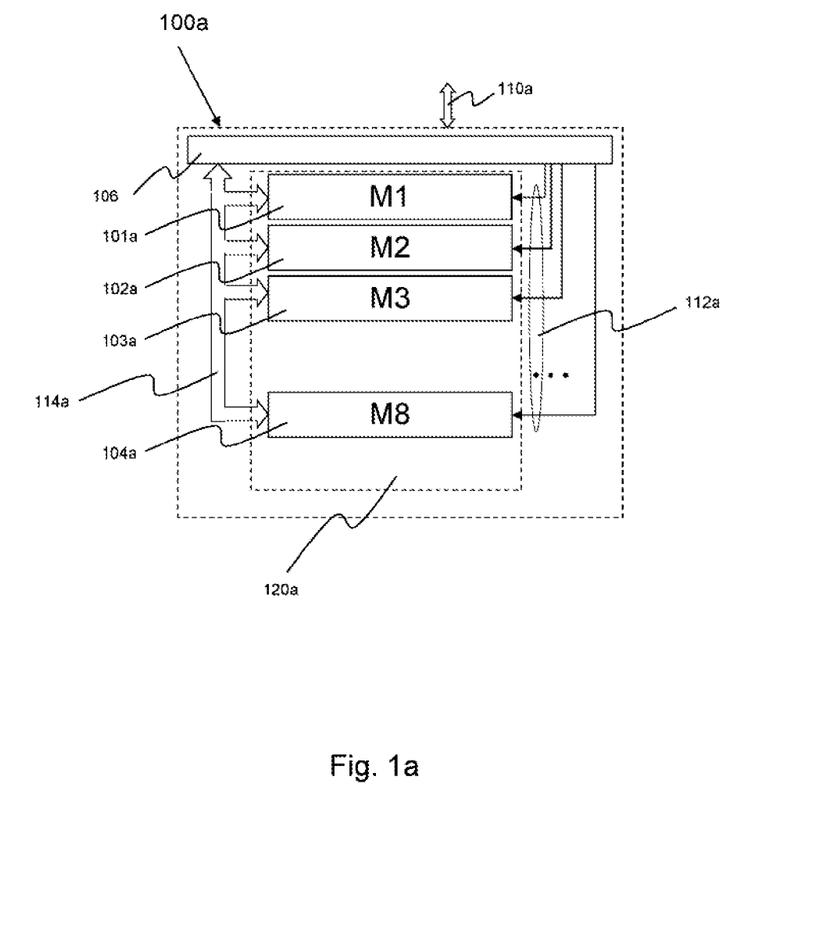
FIG. 1a shows a block diagram of a memory architecture according to an implementation form.

FIG. 1a shows a block diagram of a memory architecture 100a according to an implementation form. The memory architecture 100a comprises a plurality of memory banks 101a, 102a, 103a, 104a denoted as M1, M2, M3, . . . , M8.

The number of memory banks 101a, 102a, 103a, 104a is arbitrary and depends on the design of the memory architecture 100a. Today, memory architectures are designed comprising four, eight or sixteen memory banks. Future memory architectures may be designed with more than sixteen memory banks, e.g. comprising 32, 64 or 128 memory banks. The memory banks 101a, 102a, 103a, 104a are coupled to a memory controller 106 that is configured to control accesses to the memory banks 101a, 102a, 103a, 104a. The memory controller 106 comprises an external data interface 110a for accessing external data to be stored in the memory, i.e. in the plurality of memory banks 101a, 102a, 103a, 104a. The memory controller 106 further comprises an internal data interface 114a for transporting the external data to a respective one of the memory banks 101a, 102a, 103a, 104a and the memory controller 106 comprises a control interface 112a with multi-write control lines or single-write control line for selecting the respective one or the respective ones of the memory banks to which the external data is to be stored. According to a selection method to be described below, the memory controller 106 activates the respective write control line 112a of the memory bank 101a, 102a, 103a, 104a to which the external data is to be stored. When this write control line 112a is activated, a replica of the external data at the internal data interface 114a is written to the corresponding memory bank 101a, 102a, 103a, 104a which write control line 112a is active. When more than one write control lines 112a are activated, multiple replicas of the external data are written to the corresponding memory banks. Hence, the memory architecture 100a is able to store one or more replicas of the external data in the memory banks 101a, 102a, 103a, 104a.

The external data to be stored in the memory architecture 100a may be an information unit such as a packet descriptor, a data packet, a control information packet or a statistical counter.

A data packet is a formatted unit of data carried by a packet mode computer network. Computer communications links that do not support packets, such as traditional point-to-point telecommunications links, simply transmit data as a series of bytes, characters, or bits alone. When data is formatted into packets, the bitrate of the communication medium can be better shared among users than if the network were circuit switched. A data packet consists of two kinds of data: control information and user data, also known as payload. The control information provides data the network needs to deliver the user data, for example: source and destination addresses, error detection codes like checksums, and sequencing information. Typically, control information is found in packet headers and trailers, with payload data in between. However, control information may be transmitted in a control information packet with or without payload data in between.

A packet descriptor is a set of information that describes the packet. Packet descriptors can hold all kinds of information on a data packet. For instance, the packet descriptor comprises a pointer to a data-memory in which the packet is stored. This is used in order to decrease the amount of information that is inserted into the queuing engine. Instead of sending the entire packet to the queuing system, only the packet descriptor is sent. The packet itself is stored in a data-memory. There could be systems in which, this kind of descriptor would be enough. However, there could be cases in which the descriptor can hold more information, e.g. a packet ID. In systems in which the packet length varies from one packet to another, the packet length might be added to the packet descriptor in order to enable the scheduler to compute exactly the amount of bytes really scheduled. In a possible implementation a packet descriptor can include the header of a packet itself. In another possible implementation the packet descriptor can include one or several data fields of the header within the packet. There are many variants of packet descriptors.

The memory controller 106 is configured to initiate storage of the information units to the memory banks M1, M2, M3, . . . , M8 depending on their size. The replication approach creates two or more instances of the information unit. When the memory bank that contains the information unit is busy there is an option to find the same information in a different bank that is not busy. The traffic-aware replication according to aspects of the application minimizes a reduction of available memory due to the replications. The replication mechanism replicates according to the traffic needs. For minimum length packet with maximum packets per second (PPS) there is a need for maximum rate, hence maximum replications. However, for larger packets the number of replications is reduced. Table 1 shows a relation of replications versus packet size for an exemplary 100 Gbps bandwidth device. The PPS rate is proportional to the bandwidth and inversely related to the packet length, denoted here as packet size. Shorter packets result in a higher PPS and longer packets result in a lower PPS. The PPS rate can be determined by the relation PPS=BW/(packet size+IPG), where BW is the bandwidth of the transport channel transporting the packets and IPG is the inter packet gap. Inter packet gap is a time delay between data packets on an Ethernet communication network so that all connected machines are able to transmit the data. Ethernet nodes must wait for the network to be idle before sending data. This delay time of a few microseconds allows nodes to consider the network silent and idle at which point it will begin to send the next transmission. In table 1, an exemplary number of 20 bytes is taken as inter packet gap delay time.

TABLE 1

Replications versus packet size for 100 Gbps bandwidth

| Packet Size | max PPS (IPG = 20 B) | Instances |
|---|---|---|
| 64 B ≤ PKT < 76 B | 148.8M | 8 |
| 76 B ≤ PKT < 92 B | 130.2M | 7 |
| 92 B ≤ PKT < 115 B | 111.6M | 6 |
| 115 B ≤ PKT < 148 B | 93M | 5 |
| 148 B ≤ PKT < 204 B | 74.4M | 4 |
| 204 B ≤ PKT < 316 B | 55.8M | 3 |
| 316 B ≤ PKT < 652 B | 37.2M | 2 |
| 652 B ≤ PKT | 18.6M | 1 |

Further to replications, the replication mechanism applied by the memory controller 106 creates a relation between the memory address and number of replications such that for a read access the number of replications is known in advance. This helps the memory controller to plan its future accesses and make them very efficient.

The memory controller 106 determines the number of replicas in dependence on a rate of the information units. The memory controller 106 initiates storage of only one replica of the information unit if the size of the information unit exceeds a threshold or the rate of the information unit is below a threshold which may be adjustable. In an implementation form, the memory controller 106 determines the number of replicas as being inversely related to the size of the information unit. The plurality of memory banks M1, M2, M3, . . . , M8 are partitioned into a plurality of replication zones C1, C2, C3, . . . , C8, each of the replication zones C1, C2, C3, . . . , C8 associated to a different type, the type indicating a number of replicas of the information unit stored in the replication zone C1, C2, C3, . . . , C8. Each replication zone C1, C2, C3, . . . , C8 comprises memory addresses of each memory bank M1, M2, M3, . . . , M8.

The memory architecture 100a is not restricted to process only control information like packet descriptors, packet headers, packet trailers etc., it also processes data packets, statistical counters and any other kind of information units. The continuous decline in memory bit cost makes this replication mechanism suitable for data packets. Another issue is the smaller range of packet size. Data packets have about the same performance requirements as their control information. Therefore, the replication mechanism presented here is equally suited for control information such as packet descriptors and for data packets.

Figure 1B:
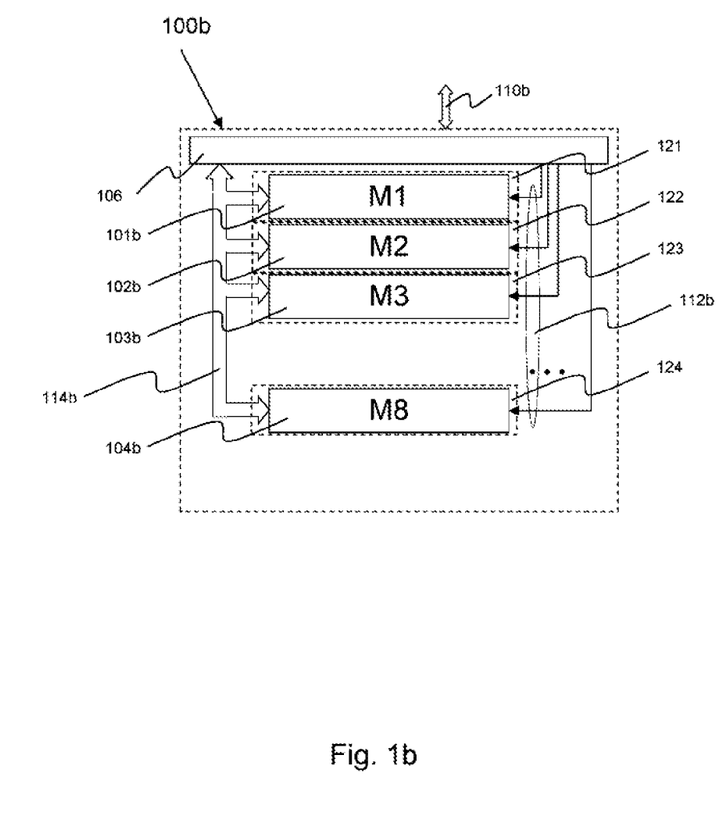
FIG. 1b shows a block diagram of a memory architecture according to an implementation form.

FIG. 1b shows a block diagram of a memory architecture 100b according to an implementation form. The memory architecture 100b comprises a plurality of memory devices 121, 122, 123, 124 each of them comprising a single memory bank 101b, 102b, 103b, 104b denoted as M1, M2, M3, . . . , M8.

The number of memory devices 121, 122, 123, 124 is arbitrary and depends on the design of the memory architecture 100b. Today, memory architectures are designed comprising four, eight or sixteen memory devices. Future memory architectures may be designed with more than sixteen memory devices, e.g. comprising 32, 64 or 128 memory devices. The memory devices 121, 122, 123, 124 and so the respective memory banks 101b, 102b, 103b, 104b are coupled to a memory controller 106 that is configured to control accesses to the memory banks 101b, 102b, 103b, 104b. The memory controller 106 comprises an external data interface 110b for accessing external data to be stored in the memory, i.e. in the plurality of memory banks 101b, 102b, 103b, 104b. The memory controller 106 further comprises an internal data interface 114b for transporting the external data to a respective one of the memory banks 101b, 102b, 103b, 104b and the memory controller 106 comprises a control interface 112b with multi-write control lines or single-write control line for selecting the respective one or the respective ones of the memory banks to which the external data is to be stored. According to a selection method to be described below, the memory controller 106 activates the respective write control line 112b of the memory bank 101b, 102b, 103b, 104b to which the external data is to be stored. When this write control line 112b is activated, a replica of the external data at the internal data interface 114b is written to the corresponding memory bank 101b, 102b, 103b, 104b which write control line 112b is active. When more than one write control lines 112b are activated, multiple replicas of the external data are written to the corresponding memory banks. Hence, the memory architecture 100b is able to store one or more replicas of the external data in the memory banks 101b, 102b, 103b, 104b. The replication mechanism is the same as described with respect to FIG. 1a.

Figure 2:
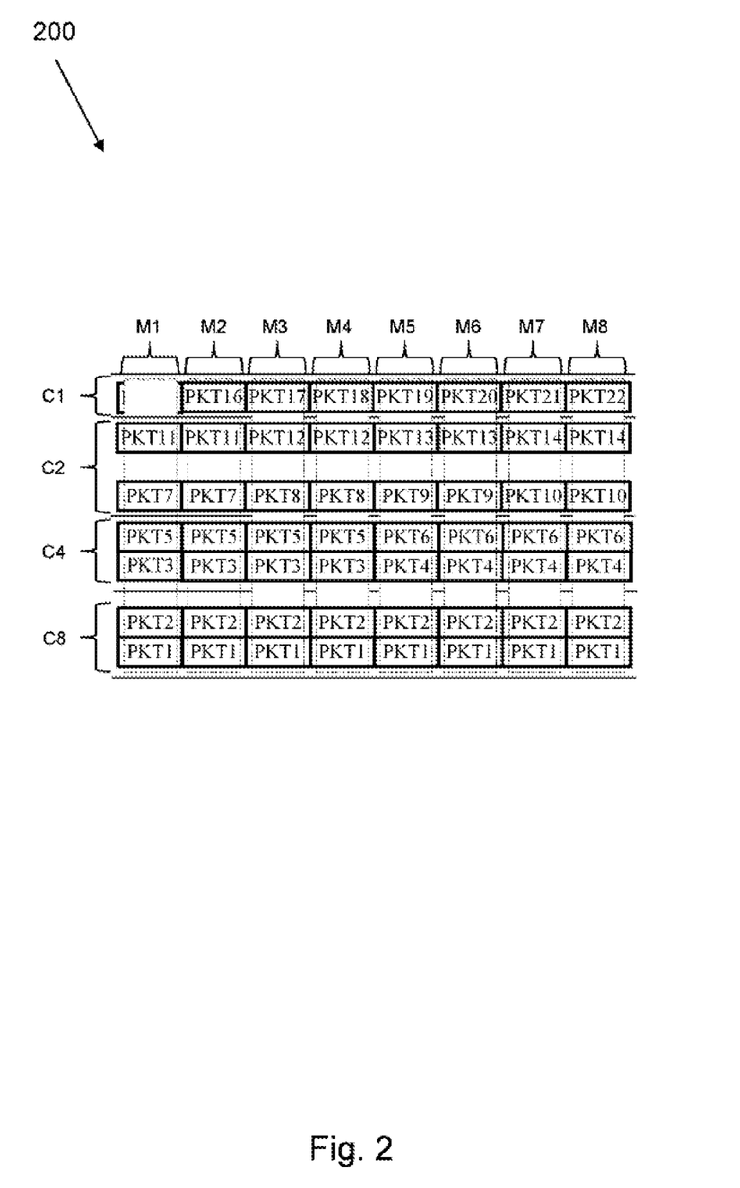
FIG. 2 shows a block diagram of a memory architecture according to an implementation form, the memory architecture comprising a plurality of memory banks partitioned into replication zones.

FIG. 2 shows a block diagram of a memory architecture 200 according to an implementation form, the memory architecture 200 comprising a plurality of memory banks M1, M2, M3, M4, M5, M6, M7, M8 partitioned into replication zones C1, C2, C4, C8.

The figure gives an example of packet replication for short-sized packets such as packet descriptors or control information. Although packets are short such that they fit in one replication zone of a memory bank, the packets may have different lengths.

The figure shows an example of control information replication for different length packets. The memory architecture 200 comprises an exemplary number of 8 memory banks M1, M2, M3, M4, M5, M6, M7, M8, also denoted as 8 devices, with internal memory partitions. The memory architecture 200 is not limited to a number of 8 memory banks as depicted here in FIG. 2. Instead, any other number of memory banks can be used according to the design of the memory architecture.

In this example only 1×, 2×, 4× and 8× (times) replications are used according to the first replication zone C1 performing one replication, i.e. one copy, of the information unit, the second replication zone C2 performing two replications, i.e. two copies, of the information unit, the third replication zone C4 performing four replications, i.e. four copies, of the information unit and the fourth replication zone C8 performing eight replications, i.e. eight copies, of the information unit.

The figure show a number of 22 packets stored in the memory banks M1, M2, M3, M4, M5, M6, M7, M8. The packets are denoted as PKT1, PKT2, PKT3, , PKT22. Eight (8) replications of packet PKT1 are stored in replication zone C8 of the memory banks, i.e. packet PKT1 is stored in all eight memory banks. Similarly, eight replications of packet PKT2 are stored in replication zone C8 of the memory banks, i.e. packet PKT2 is stored in all eight memory banks.

Four (4) replications of packet PKT3 are stored in replication zone C4 of the memory banks, i.e. packet PKT3 is stored in the four memory banks M1, M2, M3, M4. Similarly, four replications of packet PKT4 are stored in replication zone C4 of the memory banks, i.e. packet PKT4 is stored in the four memory banks M5, M6, M7, M8. Similarly, four (4) replications of packet PKT5 are stored in replication zone C4 of the memory banks, i.e. packet PKT5 is stored in the four memory banks M1, M2, M3, M4. Similarly, four (4) replications of packet PKT6 are stored in replication zone C4 of the memory banks, i.e. packet PKT6 is stored in the four memory banks M5, M6, M7, M8.

Two (2) replications of packet PKT7 are stored in replication zone C2 of the memory banks, i.e. packet PKT7 is stored in the two memory banks M1, M2. Similarly, two replications of packet PKT8 are stored in replication zone C2 of the memory banks, i.e. packet PKT8 is stored in the two memory banks M3, M4. Similarly, two replications of packet PKT9 are stored in replication zone C2 of the memory banks, i.e. packet PKT9 is stored in the two memory banks M5, M6. Similarly, two replications of packet PKT10 are stored in replication zone C2 of the memory banks, i.e. packet PKT10 is stored in the two memory banks M7, M8.

Two replications of packet PKT11 are stored in replication zone C2 of the memory banks, i.e. packet PKT11 is stored in the two memory banks M1, M2. Similarly, two replications of packet PKT12 are stored in replication zone C2 of the memory banks, i.e. packet PKT12 is stored in the two memory banks M3, M4. Similarly, two replications of packet PKT13 are stored in replication zone C2 of the memory banks, i.e. packet PKT13 is stored in the two memory banks M5, M6. Similarly, two replications of packet PKT14 are stored in replication zone C2 of the memory banks, i.e. packet PKT14 is stored in the two memory banks M7, M8.

One (1) replication of packet PKT15 is stored in replication zone C1 of the memory banks, i.e. packet PKT15 is stored in the memory bank M1. Similarly, one replication of packet PKT16 is stored in replication zone C1 of the memory banks, i.e. packet PKT16 is stored in the memory bank M2. Similarly, one replication of packet PKT17 is stored in replication zone C1 of the memory banks, i.e. packet PKT17 is stored in the memory bank M3.

Similarly, one replication of packet PKT18 is stored in replication zone C1 of the memory banks, i.e. packet PKT18 is stored in the memory bank M4. Similarly, one replication of packet PKT19 is stored in replication zone C1 of the memory banks, i.e. packet PKT19 is stored in the memory bank M5. Similarly, one replication of packet PKT20 is stored in replication zone C1 of the memory banks, i.e.

packet PKT20 is stored in the memory bank M6. Similarly, one replication of packet PKT21 is stored in replication zone C1 of the memory banks, i.e. packet PKT21 is stored in the memory bank M7. Similarly, one replication of packet PKT22 is stored in replication zone C1 of the memory banks, i.e. packet PKT22 is stored in the memory bank M8.

Assuming a 4Gb SDRAM device then there are 29-bit of byte addressing. The division by replication zones is very flexible. In an implementation form, half the memory is allocated to the 8-copies zone C8, quarter of the memory is allocated to the 4-copies zone C4, eighth of the memory is allocated to dual-copies zone C2 and a last eighth is allocated to the single-copy zone C1. So in every memory bank M1, M2, M3, M4, M5, M6, M7, M8 the first half is occupied by 8 copies, the following quarter inside the memory bank is occupied by 4-copies, the following eighth of the memory bank is occupied by dual-copies and the last eighth is occupied by single-copy. Each memory bank M1, M2, M3, M4, M5, M6, M7, M8 is partitioned in the same way so the application can distinguish between the replication types C1, C2, C4, C8 according to the address.

Figure 3:
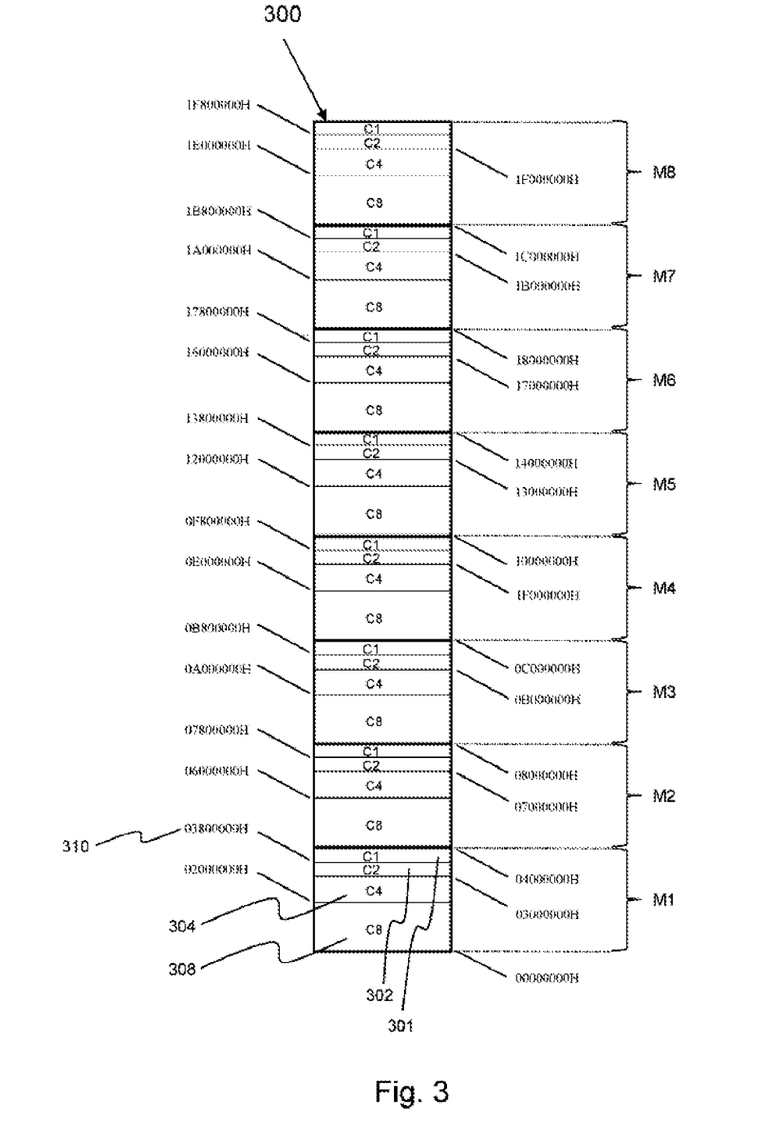
FIG. 3 shows a block diagram of a memory architecture according to an implementation form, the memory architecture comprising a plurality of memory banks partitioned into replication zones.

The same partition is shown by the memory address map depicted in FIG. 3 illustrating the different replication zones C1, C2, C4, C8. For example, a 4-copy zone C4 has two sections: the first is memory bank M1, M2, M3, M4 and the second is memory bank M5, M6, M7, M8. For example, the address 2000300H is replicated in 6000300H, A000300H and E000300H and the address 12000500H is replicated in 16000500H, 1A000500H and 1E000500H.

FIG. 3 shows a block diagram of a memory architecture 300 according to an implementation form, the memory architecture 300 comprising a plurality of memory banks M1, M2, M3, M4, M5, M6, M7, M8 in a DRAM bank architecture, the memory banks M1, M2, M3, M4, M5, M6, M7, M8 being partitioned into replication zones C1, C2, C4, C8. The memory controller is not depicted in FIG. 3. In the DRAM bank architecture described here, the memory banks M1, M2, M3, M4, M5, M6, M7, M8 constitute a uniform memory space ranging from a start address 0000 0000 H, where H denotes hexadecimal representation to an exemplary end address 1 FFF FFFF H. The end address and the number of memory banks or memory modules may vary depending on the required memory size.

The memory banks M1, M2, M3, . . . , M8 are uniformly partitioned into the replication zones C1, C2, C3, . . . , C8. In each memory bank M1, M2, M3, . . . , M8 a first part 301 of memory addresses is configured for storing a first number of replicas of the information unit, and a second part 302 of memory addresses is configured for storing a second number of replicas of the information unit. In an implementation form, a size of the first part 301 of memory addresses and a size of the second part 302 of memory addresses are adjustable. The first part 301 of memory addresses takes a first fraction of the memory addresses of each memory bank M1, M2, M3, . . . , M8 and the second part 302 of memory addresses takes a second fraction of the memory addresses of each memory bank M1, M2, M3, . . . , M8. In an implementation form, a ratio between the first fraction and the second fraction of the memory addresses is adjustable. The memory banks M1, M2, M3, . . . , M8 are configured by an address-type relation such that a memory address 310 of a memory bank M1, M2, M3, . . . , M8 indicates the type of replication zone C1, C2, C4, C8 the memory address belongs to. The memory controller is configured to use the address-type relation for planning accesses to the memory banks M1, M2, M3, . . . , M8 in advance. The memory controller is configured to allocate a number of memory addresses for storing the information unit and the replicas of the information unit depending on the size of the information unit and/or depending on a rate of the information units. In an implementation form, the memory controller is configured to initiate the storage of the information unit and the replicas of the information unit in the memory banks M1, M2, M3, . . . , M8 in a single access.

The memory controller manages a buffer for incoming access requests. This buffer holds the "pending requests". Since there is a known relation between access address and number of replications, the controller knows in advance how to plan its accesses to achieve the highest bandwidth. This is shown by the following example:

Assuming the pending buffer top has a read access to address 100H and the seven following accesses are 0000 2000 H, 0450 0000 H, 0001 0000 H, 0600 0000 H, 0000 8000 H, 0000 9000 H and 0F80 0000 H. Then the memory controller is able to look deep into the pending buffer and understand the following: The top of the pending buffer is an 8-copy type access hence there are 8 addresses where the same data could be read. The addresses of the copies are according to table 2.

TABLE 2

Example of replication planning strategy

| Bank | Address |
|---|---|
| 0 | 0000 0100 H |
| 1 | 0400 0100 H |
| 2 | 0800 0100 H |
| 3 | 0C00 0100 H |
| 4 | 1000 0100 H |
| 5 | 1400 0100 H |
| 6 | 1800 0100 H |
| 7 | 1C00 0100 H |

The next address 0000 2000 H is 8-copy type.
The next address 0450 0000 H is 8-copy type.
The next address 0001 0000 H is 8-copy type.
The next address 0600 0000 H is 4-copy type.
The next address 0000 8000 H is 8-copy type.
The next address 0000 9000 H is 8-copy type.
The next address 0F80 0000 H is single-copy type.

The memory controller builds the following sequence depicted in table 3 to avoid same bank different row access and tRC penalty:

TABLE 3

Example of memory controller replication planning strategy for avoiding same bank different row access and tRC penalty

| | Pending Access | | Actual Access | | |
|---|---|---|---|---|---|
| | Bank | Address | Bank | Address | Type |
| 1 | 0 | 00000100H | 0 | 00000100H | 8-copy |
| 2 | 0 | 00002000H | 1 | 04002000H | 8-copy |
| 3 | 1 | 04500000H | 2 | 08500000H | 8-copy |
| 4 | 0 | 00100000H | 4 | 10100000H | 8-copy |
| 5 | 2 | 06000000H | 3 | 0E000000H | 4-copy |
| 6 | 0 | 00008000H | 5 | 14008000H | 8-copy |
| 7 | 0 | 00009000H | 6 | 18009000H | 8-copy |
| 8 | 3 | 0F800000H | 7 | 0F800000H | 1-copy |

As can be seen in table 3, the original bank sequence suffers from tRC due to same bank different row accesses on 1 to 2 and 6 to 7 transactions while the actual accesses are the optimal sequence with zero penalties.

Another example illustrating the relation between performance and replications is as follows: Assuming that for a long period of time all accesses are 4-copy type and reside in the lower 4 banks. In this case the bank sequence is always: 0, 1, 2, 3, 0, 1, 2, 3, 0, . . . and so on. If the design is such that 8 banks round takes roughly tRC then 4 banks round takes approximately half tRC. That means that only four accesses can be committed in tRC time instead of 8 accesses yielding 50% of the maximum performance rate. However this is exactly the rate that meets the bandwidth of this type of traffic. By doing these smart traffic aware replications the memory architecture 300 can be designed for saving both memory space and power.

Figure 4:
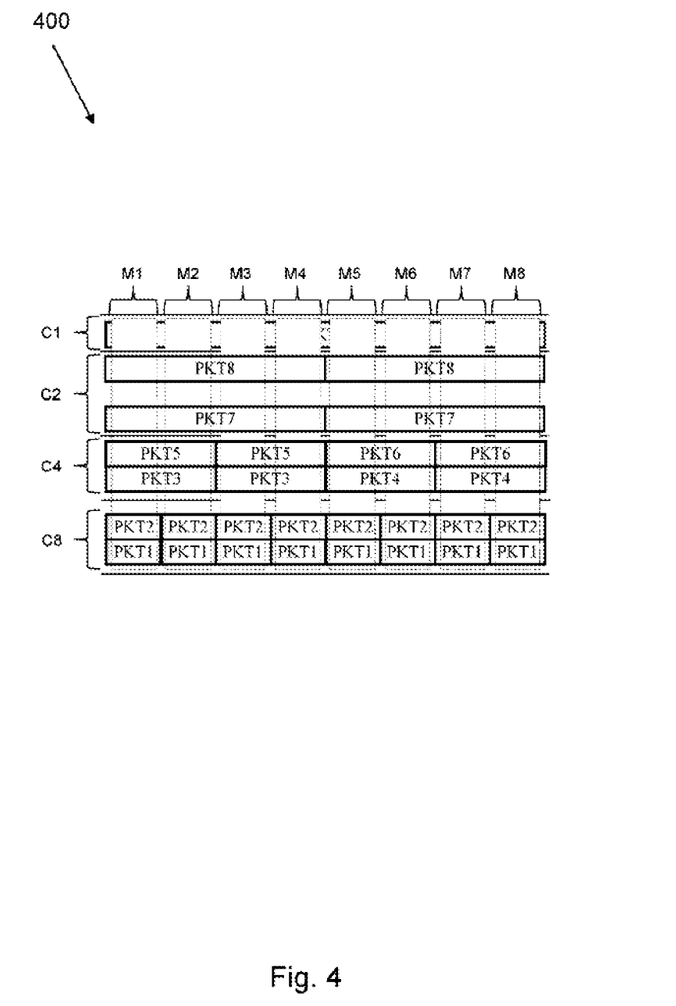
FIG. 4 shows a block diagram of a memory architecture according to an implementation form, the memory architecture comprising a plurality of memory banks partitioned into replication zones.

FIG. 4 shows a block diagram of a memory architecture 400 according to an implementation form, the memory architecture 400 comprising a plurality of memory banks M1, M2, M3, M4, M5, M6, M7, M8 partitioned into replication zones C1, C2, C4, C8. The figure gives an example of variable length packet replication as applied to data packet replication.

The figure gives an example of packet replication for variable-sized packets such as data packets, payload packets or user data packets. These packets may have a length not fitting in one replication zone of a memory bank.

The figure shows an example of data packet replication for variable sized packets. The memory architecture 400 comprises an exemplary number of 8 memory banks M1, M2, M3, M4, M5, M6, M7, M8 also denoted as 8 devices, with internal memory partitions. The memory architecture 400 is not limited to a number of 8 memory banks as depicted here in FIG. 4. Instead, any other number of memory banks can be used according to the design of the memory architecture.

In this example 1×, 2×, 4× and 8× (times) replications are used according to the first replication zone C1 performing one replication, i.e. one copy, of the information unit, the second replication zone C2 performing two replications, i.e. two copies, of the information unit, the third replication zone C4 performing four replications, i.e. four copies, of the information unit and the fourth replication zone C8 performing eight replications, i.e. eight copies, of the information unit.

The figure shows a number of 9 packets stored in the memory banks M1, M2, M3, M4, M5, M6, M7, M8. The packets are denoted as PKT1, PKT2, PKT3, , PKT9. Packets PKT1 and PKT2 are short packets, packets PKT3, PKT4, PKT5 and PKT6 have a medium size, packets PKT7 and PKT8 have a long size and packet PKT9 has a very long size.

Packets PKT1 and PKT2 have a short size fitting in a replication zone of a memory bank. Eight (8) replications of packet PKT1 are stored in replication zone C8 of the memory banks, i.e. packet PKT1 is stored in all eight memory banks. Similarly, eight replications of packet PKT2 are stored in replication zone C8 of the memory banks, i.e. packet PKT2 is stored in all eight memory banks.

Packet PKT3 has a medium size not fitting in a replication zone of a single memory bank. Thus, a partition of the packet in two parts and storage of the parts in two memory banks is required. Two replications of packet PKT3 are stored in replication zone C4 of the memory banks, i.e. a first part of first replication of packet PKT3 is stored in memory bank M1, a second part of first replication of packet PKT3 is stored in memory bank M2, a first part of second replication of packet PKT3 is stored in memory bank M3 and a second part of second replication of packet PKT3 is stored in memory bank M4.

Similarly, packet PKT4 has a medium size not fitting in a replication zone of a single memory bank. Thus, a partition of the packet in two parts and storage of the parts in two memory banks is required. Packet PKT4 is stored together with packet PKT3 in replication zone C4 of the memory banks. Two replications of packet PKT4 are stored in replication zone C4 of the memory banks, i.e. a first part of first replication of packet PKT4 is stored in memory bank M5, a second part of first replication of packet PKT4 is stored in memory bank M6, a first part of second replication of packet PKT4 is stored in memory bank M7 and a second part of second replication of packet PKT4 is stored in memory bank M8.

Similarly, packet PKT5 has a medium size not fitting in a replication zone of a single memory bank. Thus, a partition of the packet in two parts and storage of the parts in two memory banks is required. Two replications of packet PKT5 are stored in replication zone C4 of the memory banks, i.e. a first part of first replication of packet PKT5 is stored in memory bank M1, a second part of first replication of packet PKT5 is stored in memory bank M2, a first part of second replication of packet PKT5 is stored in memory bank M3 and a second part of second replication of packet PKT5 is stored in memory bank M4.

Similarly, packet PKT6 has a medium size not fitting in a replication zone of a single memory bank. Thus, a partition of the packet in two parts and storage of the parts in two memory banks is required. Packet PKT6 is stored together with packet PKT5 in replication zone C4 of the memory banks. Two replications of packet PKT6 are stored in replication zone C4 of the memory banks, i.e. a first part of first replication of packet PKT6 is stored in memory bank M5, a second part of first replication of packet PKT6 is stored in memory bank M6, a first part of second replication of packet PKT6 is stored in memory bank M7 and a second part of second replication of packet PKT6 is stored in memory bank M8.

Packet PKT7 has a long size not fitting in a replication zone of one or two memory banks. Thus, a partition of the packet in four parts and storage of the parts in four memory banks is required. Two replications of packet PKT7 are stored in replication zone C2 of the memory banks, i.e. a first part of first replication of packet PKT7 is stored in memory bank M1, a second part of first replication of packet PKT7 is stored in memory bank M2, a third part of first replication of packet PKT7 is stored in memory bank M3, a fourth part of first replication of packet PKT7 is stored in memory bank M4, a first part of second replication of packet PKT7 is stored in memory bank M5, a second part of second replication of packet PKT7 is stored in memory bank M6, a third part of second replication of packet PKT7 is stored in memory bank M7 and a fourth part of second replication of packet PKT7 is stored in memory bank M8.

Similarly, packet PKT8 has a long size not fitting in a replication zone of one or two memory banks. Thus, a partition of the packet in four parts and storage of the parts in four memory banks is required. Two replications of packet PKT8 are stored in replication zone C2 of the memory banks, i.e. a first part of first replication of packet PKT8 is stored in memory bank M1, a second part of first replication of packet PKT8 is stored in memory bank M2, a third part of first replication of packet PKT8 is stored in memory bank M3, a fourth part of first replication of packet PKT8 is stored in memory bank M4, a first part of second replication of packet PKT8 is stored in memory bank M5, a second part of second replication of packet PKT8 is stored in memory bank M6, a third part of second replication of packet PKT8 is stored in memory bank M7 and a fourth part of second replication of packet PKT8 is stored in memory bank M8.

Packet PKT9 has a very long size not fitting in a replication zone of one or two or four memory banks. Thus, a partition of the packet in eight parts and storage of the parts in eight memory banks is required. One replication of packet PKT9 are stored in replication zone C1 of the memory banks, i.e. a first part of the replication of packet PKT9 is stored in memory bank M1, a second part of the replication of packet PKT9 is stored in memory bank M2, a third part of the replication of packet PKT9 is stored in memory bank M3, a fourth part of the replication of packet PKT9 is stored in memory bank M4, a fifth part of the replication of packet PKT9 is stored in memory bank M5, a sixth part of the replication of packet PKT9 is stored in memory bank M6, a seventh part of the replication of packet PKT9 is stored in memory bank M7 and an eighth part of the replication of packet PKT9 is stored in memory bank M8.

The difference illustrated in FIG. 4 compared to control replication as illustrated in FIG. 2 is that data packets have variable size. For example, packets PKT3 through PKT5 are twice as big as packets PKT1 and PKT2. In an implementation form packet sizes are not an integer multiplication of one another. The memory architecture 400 is configured to round the sizes up to the next number that is an integer multiplication.

The following example illustrates rounding up for packet sizes from 64B to 1,000B. In this example, powers of 2 are uses as they are convenient, i.e. easy to implement. In an exemplary implementation form, packet sizes from 512 to 1,000 are rounded up to 1,024;
packet sizes from 256 to 511 are rounded up to 512;
packet sizes from 128 to 255 are rounded up to 256; and
packet sizes from 64 to 127 are rounded up to 128.

In the memory architecture 400, there are pre-allocated partitions according to packet size or equivalently—partitions according to the number of replications so that the memory architecture 400 knows in advance the number of replications and where they are in order to make an access with minimum penalty.

However, when rounding up packet sizes, the consequences are waste in memory space. If for example a 512 byte (512B) packet will occupy 1024 byte buffer then about half of the buffer is wasted. Further to that some packets will go thorough replications that make this problem even more severe. In an implementation form overcoming this disadvantage, small buffers, e.g. of size 64 bytes, are managed and the required amount of buffers is allocated for the packet and its replications. In an implementation form, a list of free pointers together with a mechanism of allocating and releasing them is managed. In this implementation form performing rounding up packet sizes to 64 bytes, the maximum waste per packet is limited to 63B.

Figure 5:
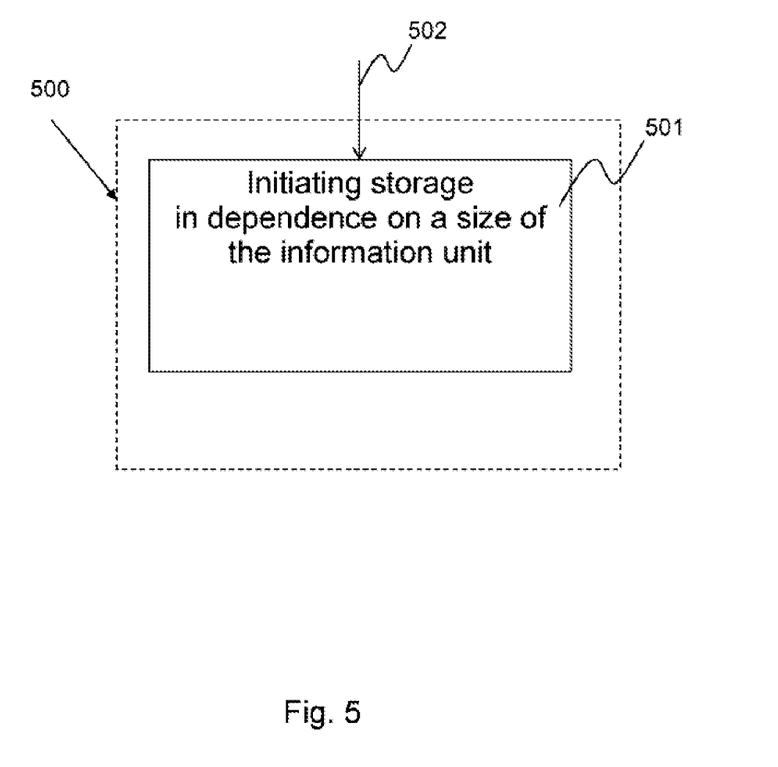
FIG. 5 shows a schematic diagram of a method for storing information units in a plurality of memory banks according to an implementation form.

FIG. 5 shows a schematic diagram of a method 500 for storing information units 502 in a plurality of memory banks according to an implementation form. The method 500 comprises: Initiating 501 storage of an information unit 502 and a number of replicas of the information unit 502 in the memory banks M1, M2, M3, . . . , M8 in dependence on a size of the information unit 502. The information units 502 to be stored correspond to the information units as described with respect to FIGS. 1 to 4. The method 500 corresponds to the replication mechanism applied in memory architectures 100a, 100b, 200, 300, 400 as described with respect to FIGS. 1 to 4.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the application beyond those described herein. While the present applications has been described with reference to one or more particular embodiments, those skilled in the art recognize that many changes may be made thereto without departing from the scope of the present application. It is therefore to be understood that within the scope of the appended claims and their equivalents, the applications may be practiced otherwise than as specifically described herein.

The invention claimed is:

1. A memory architecture for storing information units, the memory architecture comprising:
    a plurality of memory banks or a plurality of memory devices, the plurality of memory banks or memory devices are partitioned into a plurality of replication zones, each of the replication zones associated to a different type, the type indicating a number of replicas of an information unit stored in the replication zone, each memory bank or memory device comprises:
        a first part of memory addresses configured for storing a first number of replicas of the information unit, and
        a second part of the memory addresses configured for storing a second number of replicas of the information unit; and
    a memory controller for initiating storage of the information unit and the number of replicas of the information unit in the memory banks or in the memory devices, the memory controller creating a relation between the first part of the memory addresses and the second part of the memory addresses with the number of replicas to determine the number of replicas in advance of initiating the storage of the information unit and the replicas of the information unit in the memory banks or the memory devices in a single access or in a group of accesses and discriminating the replicas based on a size of the information unit and the memory addresses,
    wherein the created relation between the first part of the memory addresses and the second part of the memory addresses with the number of replicas indicates a type of replication zone the first part of the memory addresses and the second part of the memory addresses belong.

2. The memory architecture of claim 1, wherein the information unit is one of
    a packet descriptor,
    a data packet,
    a control information packet, and
    a statistical counter.

3. The memory architecture of claim 1, wherein the memory controller is configured to determine the number of replicas in dependence on a rate of incoming data traffic of the information units.

4. The memory architecture of claim 3, wherein the memory controller is configured to initiate storage of only one replica of the information unit if the size of the information unit exceeds a first threshold or if the rate of incoming data traffic of the information unit is below a second threshold.

5. The memory architecture of claim 1, wherein the memory controller is configured to determine the number of replicas as being inversely related to the size of the information unit.

6. The memory architecture of claim 1, wherein each replication zone comprises memory addresses of each memory bank within the respective replication zone.

7. The memory architecture of claim 1, wherein the memory banks or the memory devices are uniformly partitioned into the replication zones.

8. The memory architecture of claim 1,
wherein a size of the first part of memory addresses and a size of the second part of memory addresses are adjustable.

9. The memory architecture of claim 8, wherein
the first part of memory addresses takes a first fraction of the memory addresses of each memory bank or memory device within the respective replication zone, and
the second part of memory addresses takes a second fraction of the memory addresses of each memory bank or memory device within the respective replication zone, wherein a ratio between the first fraction and the second fraction of the memory addresses is adjustable.

10. The memory architecture of claim 1, wherein the memory controller is configured to use the address-type relation for planning accesses to the memory banks or memory devices in advance.

11. The memory architecture of claim 1, wherein the memory controller is configured to allocate a number of memory addresses for storing the information unit and the replicas of the information unit depending on the size of the information unit and/or depending on a rate of incoming data traffic of the information units.

12. The memory architecture of claim 1, wherein the memory controller is configured to initiate the storage of the information unit and the replicas of the information unit in the memory banks or memory devices in the single access or in the group of accesses.

13. A method for storing information units in a plurality of memory banks or in a plurality of memory devices, the plurality of memory banks or memory devices are partitioned into a plurality of replication zones, each of the replication zones associated to a different type, the type indicating a number of replicas of an information unit stored in the replication zone, each memory bank or memory device comprises:
a first part of memory addresses configured for storing a first number of replicas of the information unit, and
a second part of the memory addresses configured for storing a second number of replicas of the information unit, the method comprising:
initiating storage of the information unit and the number of replicas of the information unit in the memory banks or in the memory devices by creating a relation between the first part of the memory addresses and the second part of the memory addresses with the number of replicas to determine the number of replicas in advance of initiating the storage of the information unit and the replicas of the information unit in the memory banks or the memory devices in a single access or in a group of accesses and discriminating the replicas based on a size of the information unit and the memory addresses,
wherein the created relation between the first part of the memory addresses and the second part of the memory addresses with the number of replicas indicates a type of replication zone the first part of the memory addresses and the second part of the memory addresses belong.

14. A memory, the memory comprising:
memory banks, the memory banks are partitioned into a plurality of replication zones, each of the replication zones associated to a different type, the type indicating a number of replicas of an information unit stored in the replication zone, each memory bank comprises:
a first part of memory addresses configured for storing a first number of replicas of the information unit, and
a second part of the memory addresses configured for storing a second number of replicas of the information unit; and
a memory controller to initiate storage of the information unit and the number of replicas of the information unit in the memory banks, the memory controller creating a relation between the first part of the memory addresses and the second part of the memory addresses with the number of replicas to determine the number of replicas in advance of initiating the storage of the information unit and the replicas of the information unit in the memory banks or the memory devices in a single access or in a group of accesses and discriminating the replicas based on a size of the information unit and the memory addresses,
wherein the created relation between the first part of the memory addresses and the second part of the memory addresses with the number of replicas indicates a type of replication zone the first part of the memory addresses and the second part of the memory addresses belong.

* * * * *